Jan. 31, 1961  R. W. ANTHONY  2,969,697
INDEXING FIXTURE
Filed Oct. 7, 1957
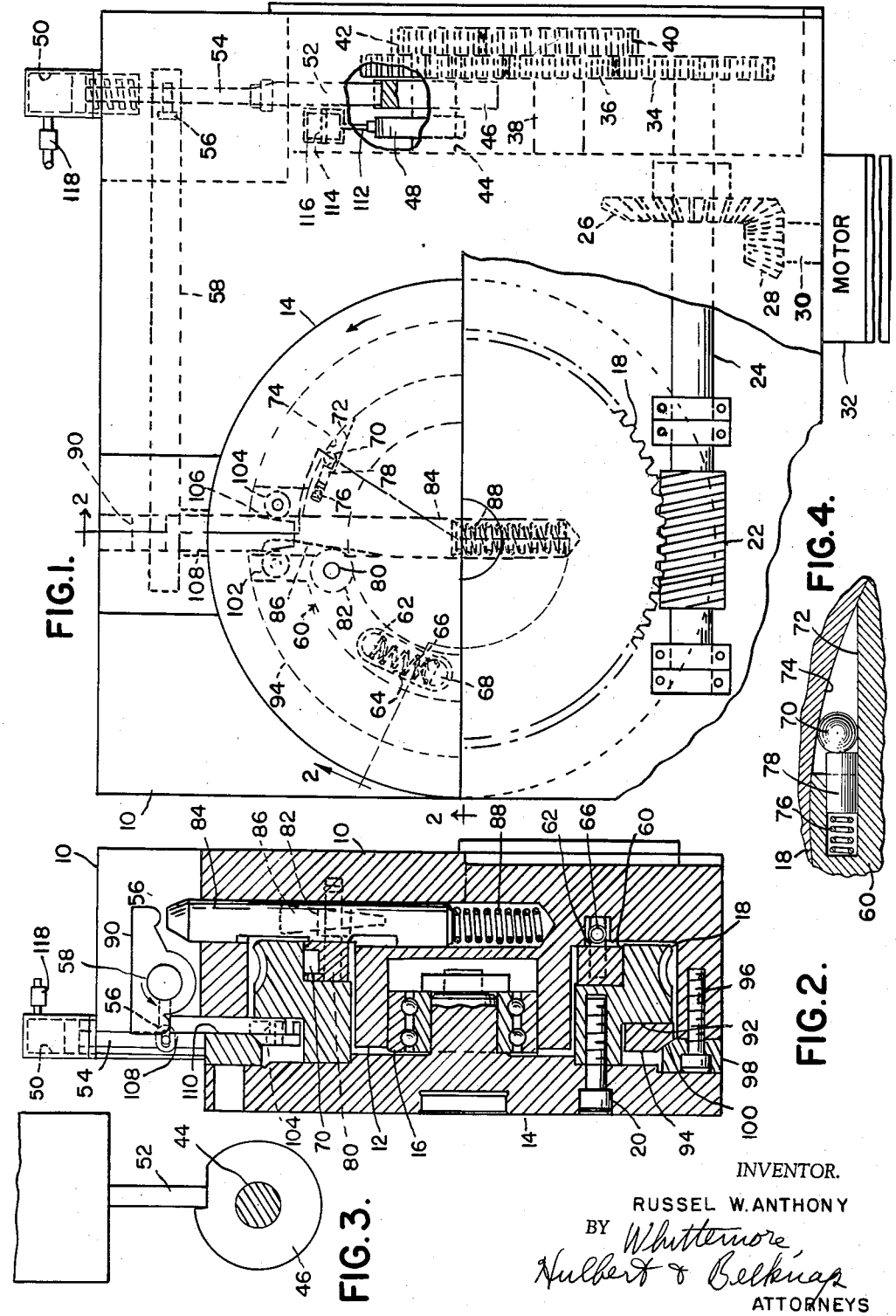
INVENTOR.
RUSSEL W. ANTHONY
BY Whittemore,
Hulbert & Belknap
ATTORNEYS

United States Patent Office 2,969,697
Patented Jan. 31, 1961

2,969,697

INDEXING FIXTURE

Russel W. Anthony, Detroit, Mich., assignor to National Broach & Machine Company, Detroit, Mich., a corporation of Michigan Filed Oct. 7, 1957, Ser. No. 688,729

20 Claims. (Cl. 74—823)

The present invention relates to an indexing fixture.

It is an object of the present invention to provide an indexing fixture characterized by its accurate location, the absence of wear on locating surfaces, and the elimination of thrust or wear on elements cooperating to assist in location.

More specifically, it is an object of the present invention to provide a locating fixture including a worm gear, a worm in mesh therewith, a motor for driving said worm, stop means for arresting angular movement of said worm in predetermined positively fixed position, means for biasing said gear to cause its teeth to engage the trailing or locating surfaces of the tooth of the worm gear, and clamping means independent of the worm for locking the gear in located position.

Other objects and features of the invention will become apparent as the description proceeds, especially when taken in conjunction with the accompanying drawing, illustrating a preferred embodiment of the invention, wherein:

Figure 1 is a plan view of the fixture with parts broken away.

Figure 2 is a sectional view on the broken line 2—2, Figure 1.

Figure 3 is an enlarged diagrammatic view of the work stop mechanism.

Figure 4 is an enlarged sectional view of the one-way brake between the worm gear and the locator ring.

The fixture comprises a main frame 10 having a centrally disposed recessed boss 12 in which the indexed member 14 is supported by bearings indicated at 16. Secured to the underside of the member 14 is a worm gear 18, the worm gear being shown as bolted to the indexed member 14 by screws 20.

Journaled within the frame 10 is a worm 22 which is in mesh with the worm gear 18, there being some backlash between the teeth of the gear 18 and the tooth or teeth of the worm 22. Thus, the teeth of the gear 18 may be said to have driven sides and locating sides and the tooth or teeth of the worm may be said to have a driving side or sides and a locating side or sides. The worm 22 is carried by a shaft 24 carrying a bevel gear 26 meshing with a bevel gear 28 connected to the shaft 30 of an electric or hydraulic motor 32. The shaft 24 carries a gear 34 which meshes with a gear 36 carried by a stub shaft 38 which also carries a gear 40 meshing with a gear 42. The gear 42 is carried by a shaft 44 which also carries a stop plate or locator disc 46 best illustrated in Figure 3, and also a cam 48 for a purpose which will presently appear. A fluid cylinder 50 is provided having a piston and rod 54 therein. The rod 54 is connected to a locator or stop pin 52 associated with the stop plate 46. Also connected to the piston rod 54 at an intermediate point thereon is a crank arm 56 which in turn is fixed to a shaft 58 to rock the shaft, as will subsequently be described.

As best seen in Figure 2, the inner lower corner of the worm gear 18 is cut away and receives a locator ring 60. This ring 60 has depending therefrom a pin 62 which extends into an elongated chamber 64 where it engages a compression spring 66 the opposite end of which engages the end of a pin 68 fastened in the frame 10. As a result of the foregoing the spring 66 biases the ring 60 in a clockwise direction as seen in Figure 1.

Located in the outer cylindrical surface of the locator ring 60 is means providing a one-way connection between the ring and the worm gear 18. This means comprises a spring pressed ball or roller 70 engageable between a wedging surface 72 of the locator ring and an inner surface 74 of the worm gear. The biasing spring is indicated at 76 and presses a pin 78 against the ball or roller 70. In operation it is assumed that the worm is driven in such direction as to advance the indexed member 14 in the direction of the arrow, or counterclockwise as seen in Figure 1.

Also depending from the underside of the locator ring 60 is a pin 80 carrying a roller 82. Movable longitudinally in the frame or base 10 is a pin 84 having an inclined camming surface 86 engageable by the roller 82. It will be apparent that the compression spring 66 maintains the roller 82 against the surface 86. The inner end of the pin 84 engages a compression spring 88. The outer end of the pin, as best seen in Figure 2, is engageable by one arm of an actuating lever 90 fixed to the previously described shaft 58. When the shaft is rotated in the proper direction, the lever 90 engages the outer end of the pin 84 and presses it inwardly against the spring 88, thus permitting limited clockwise rotation of the locator ring 60.

The upper and outer corner portion of the worm gear 18 is cut away to provide a seat 92 for a split expanding wedge ring 94. Bolted as indicated at 96 to the frame or base 10 is a cooperating wedge ring 98 having an inclined wedging surface 100. As best seen in Figure 1, the free ends of the expanding wedge ring 94 are provided with rollers 102 and 104 which are engageable with opposite tapered sides 106 on a pin 108 mounted for longitudinal movement in a guideway 110. The outer end of the pin 108 is engageable by the other arm of the lever 90 and when lever 90 is rocked in a counterclockwise direction, as seen in Figure 2, it forces the pin 108 inwardly, thus forcing the rollers 102 and 104 apart and expanding the split wedge ring 94 against the surface 100 of ring 98 and surface 92 of gear 18 to lock gear 18 and attached indexed member 14 rigidly to the frame or base 10. It will be noted that this wedge lock action is entirely independent of the worm and accordingly has no effect on the accuracy of location.

The cam 48 previously referred to is engaged by a cam follower 112 connected to a piston 114 of a dashpot indicated at 116, and operates to oppose rotation of the worm as the locating notch of the locator disc 46 approaches the locator pin 52.

It will be understood that means are provided for effecting properly timed actuation of the motor 32 and piston and cylinder 50. For this purpose the air supply to the piston 50 may be controlled by a suitable solenoid valve indicated diagrammatically at 118. The motor 32 is de-energized just before completion of a single rotation of the locator disc 46. Upon de-energization of the motor 32, by means well known in the art, the solenoid control valve 118 is actuated so as to admit fluid pressure to the piston in cylinder 50 so as to advance the stop pin 52 in position to intercept the locating shoulder on the disc 46.

The complete operation is apparent from the foregoing description but will be briefly reviewed. In the first place, it will be observed that predetermined angular rotation is imparted to the worm as determined by the change gearing including the gears 34, 36 and 42, which drive the locator disc 46 in rotation. The arrangement is such that the locator disc 46 is allowed to make a single rotation and this in turn will result in a predetermined angular movement of the worm gear 18. The motor 32 is de-energized just before completion of a single rotation of the locator disc 46 and de-energization of the motor is accompanied by actuation of the solenoid controlled valve 118 admitting a fluid pressure to a piston in cylinder 50 acting against the stop pin 52 to advance the stop pin 52 in position to intercept the locating shoulder on the disc 46. At the same time, angular movement is imparted to the shaft 58 by the arm 56 and this movement is in a counterclockwise direction as seen in Figure 2. Initial movement of the lever away from the pin 84 permits the spring 88 to move the pin 15 outwardly thus moving the roller 82 counterclockwise as seen in Figure 1, and moving the locator ring 60 in the same direction. This movement of the locator ring is transmitted through the ball or roller 70 to the worm gear and has the effect of driving the worm gear ahead of the worm so as to bring the locator side of the gear teeth in contact with the trailing or locating side or sides of the worm tooth or teeth. Subsequent to this further movement of the lever 90 results in pressing the pin 108 radially inwardly and expanding the wedge ring 94 to lock the gear in accurately adjusted position.

It will be apparent that the worm, which drives the worm gear into indexed position, serves to locate the worm gear in such position by engagement between locating sides of the teeth thereof, which sides do not contact during driving of the worm gear by the worm. Accordingly, there is no wear on these locating surfaces and hence the location remains true and accurate throughout the life of the fixture. Secondly, it will be observed that the foregoing arrangement provides means effective to rigidly lock the worm gear and indexed member 14 in accurately indexed position in such a way as to relieve the indexing worm and worm gear from all strain which might be occasioned by operations performed on a work piece carried by the indexed member. It will of course be apparent that the successful operation of the fixture entails sequential operation in which following de-energization of the motor, the dashpot including the mechanism 114, 116 operates to slow rotation of the worm and locator disc 46 before engagement between the locator pin 52 and the locator shoulder on the disc 46. At the same time, the limited angular movement imparted to the locator ring 60 must take place to position the locating side of the worm gear teeth against the locator side of the worm tooth after rotation of the worm has ceased and before wedged locking of the worm gear takes place. This of course is taken care of mechanically by employing the single lever 90 which necessarily sequentially releases the pin 84 for providing locating movement of the locator ring 60 and thereafter engaging the pin 84 to actuate the wedge clamping mechanism.

The drawings and the foregoing specification constitute a description of the improved indexing fixture in such full, clear, concise and exact terms as to enable any person skilled in the art to practice the invention, the scope of which is indicated by the appended claims.

What I claim as my invention is:

1. Index mechanism comprising a worm gear, a worm in mesh therewith, said worm having a tooth provided with a drive and a locating side, means for driving said worm in equal increments of rotation, means operable upon stopping of said worm to advance said worm gear against the locating side of said worm tooth, and means for clamping said worm gear in located position.

2. Index mechanism comprising a worm gear, a worm in mesh therewith, said worm having a tooth provided with a drive and a locating side, means for driving said worm in equal increments of rotation, means operable upon stopping of said worm to advance said worm gear against the locating side of said worm tooth, and means completely independent of said worm for clamping said worm gear in located position.

3. Index mechanism comprising a worm gear, a worm in mesh therewith, said worm having a tooth provided with a drive and a locating side, means for driving said worm in equal increments of rotation, a locator plate for stopping said worm in exactly predetermined position, means operable upon stopping of said worm to advance said worm gear against the locating side of said worm tooth, and means for clamping said worm gear in located position.

4. Index mechanism comprising a worm gear, a worm in mesh therewith, said worm having a tooth provided with a drive and a locating side, means for driving said worm through a predetermined angular movement, stop means for positively stopping said worm in predetermined position, means for opposing rotation of said worm during approach to said stop means, means operable upon termination of drive of said worm of biasing said worm gear ahead to engage the locating side of the worm teeth.

5. Index mechanism comprising a worm gear, a worm in mesh therewith, said worm having a tooth provided with a drive and a locating side, means for driving said worm through a predetermined angular movement, stop means for positively stopping said worm in predetermined position, means for opposing rotation of said worm during approach to said stop means, means operable upon termination of drive of said worm of biasing said worm gear ahead to engage the locating side of the worm teeth, and means for clamping said worm gear in located position.

6. Index mechanism comprising a worm gear, a worm in mesh therewith, said worm having a tooth provided with a drive and a locating side, means for driving said worm through a predetermined angular movement, stop means for positively stopping said worm in predetermined position, means for opposing rotation of said worm during approach to said stop means, means operable upon termination of drive of said worm of biasing said worm gear ahead to engage the locating side of the worm teeth, and means entirely independent of said worm for clamping said worm gear in located position.

7. Index mechanism comprising a frame, a worm gear rotatable therein, a worm in mesh with said gear, a movable member carried by said frame having a one-way drive connection with said gear to drive it in the same direction as the gear is driven by said worm, a motor connected to said worm, and means operable concurrently with de-energization of said motor to move said movable member in a direction to move said gear ahead to contact the trailing sides of the worm tooth.

8. Index mechanism comprising a frame, a worm gear rotatable therein, a worm in mesh with said gear, an angularly movable member carried by said frame having a one-way drive connection with said gear to drive it in the same direction as the gear is driven by said worm, a motor connected to said worm, and means operable concurrently with de-energization of said motor to move said movable member in a direction to move said gear ahead to contact the trailing sides of the worm tooth.

9. Index mechanism comprising a frame, a worm gear rotatable therein, a worm in mesh with said gear, a movable member carried by said frame having a one-way drive connection with said gear to drive it in the same direction as the gear is driven by said worm, a motor connected to said worm, means operable concurrently with de-energization of said motor to move said movable member in a direction to move said gear ahead to contact the trailing sides of the worm tooth, and means for thereafter locking said gear against rotation.

10. Mechanism as defined in claim 9 in which the means for moving the movable member and the means for locking the gear include a single member to actuate said means in sequence.

11. Index mechanism comprising a frame, a worm gear rotatable therein, a worm in mesh with said gear, a movable member carried by said frame having a one-way drive connection with said gear to drive it in the same direction as the gear is driven by said worm, a motor connected to said worm, means operable concurrently with de-energization of said motor to move said movable member in a direction to move said gear ahead to contact the trailing sides of the worm tooth, and wedge means operable after location of said gear to lock said gear in located position.

12. Index mechanism comprising a frame, a worm gear rotatable therein, a worm in mesh with said gear, a movable member carried by said frame having a one-way drive connection with said gear to drive it in the same direction as the gear is driven by said worm, a motor connected to said worm, means operable concurrently with de-energization of said motor to move said movable member in a direction to move said gear ahead to contact the trailing sides of the worm tooth, and expanding wedge means carried by said gear and engageable with a wedge surface on said frame to lock said gear in located position.

13. Index mechanism comprising a frame, a worm gear rotatable therein, a worm in mesh with said gear, a locator ring concentric with said gear and having a one-way drive connection therewith to drive said gear in the same direction as the gear is driven by said worm, a split wedge ring engaged between said gear and frame, a motor connected to said worm, and means operable upon de-energization of said motor first to shift said locator ring to locate said gear against the trailing side of the worm tooth and then expand said wedge ring to lock said located gear to said frame.

14. Structure as defined in claim 13 in which said means includes a member movable from a first position in which it holds said locator ring against locating movement to a second position in which said wedge ring is engaged.

15. Index mechanism comprising a frame, a worm gear rotatable therein, a worm in mesh with said gear, a locator ring concentric with said gear and having a one-way drive connection therewith to drive said gear in the same direction as the gear is driven by said worm, a split wedge ring engaged between said gear and frame, a motor connected to said worm, rigid stop means for arresting rotation of said worm in fixed angular position, and means operable upon de-energization of said motor first to shift said locator ring to locate said gear against the trailing side of the worm tooth and then expand said wedge ring to lock said located gear to said frame.

16. Index mechanism comprising a driving member having a driving and a locating side, a driven member, means for moving said driving side against said driven member to impart an index increment, means operable on stopping of said driving side movement to advance said driven member against the locating side of said driving member, and wedge means operable after location of said driven member to lock said driven member in located position.

17. Index mechanism comprising a driving member having a driving and a locating side, a driven member, means for moving said driving side against said driven member to impart an index increment, means operable on stopping of said driving side movement to advance said driven member against the locating side of said driving member, and means for clamping said driven member in located position.

18. Index mechanism comprising a frame, a driving member carried by said frame and having a driving and a locating side, a driven member, means for moving said driving side against said driven member to impart an index increment, locating means for stopping said driving member in exactly predetermined position, means operable on stopping of said driving side movement to advance said driven member against the locating side of said driving member, and expanding wedge means carried by said driving member and engageable with a wedge surface on said frame to lock said driven member in located position.

19. Index mechanism comprising a driving member having a driving side, a driven member, means for moving said driving side against said driven member to impart an index increment, locating means for stopping said driving member in exactly predetermined position, and means for retarding said driving member prior to the stopping by said locating means.

20. Index mechanism comprising a driving member having a driving side, a driven member, means for moving said driving side against said driven member to impart an index increment, locating means for stopping said driving member in exactly predetermined position, means for retarding said driving member prior to the stopping by said locating means, and means completely independent of said driving member for clamping said driven member in located position.

References Cited in the file of this patent

UNITED STATES PATENTS

| | | |
|---|---|---|
| 1,656,313 | Blood et al. | Jan. 17, 1928 |
| 2,443,278 | Stratton | June 15, 1948 |
| 2,464,996 | Schafer et al. | Mar. 22, 1949 |
| 2,622,487 | Schultz | Dec. 23, 1952 |
| 2,786,360 | Cameron | Mar. 26, 1957 |